Oct. 17, 1961     J. N. MULLINS, JR     3,004,398
DISPENSER AND CONTROLS THEREFOR

Filed April 8, 1959     3 Sheets-Sheet 1

INVENTOR
J. N. MULLINS JR.

BY *John H. Widdowson*

ATTORNEY

INVENTOR
J. N. MULLINS JR.

BY John H. Widdowson
ATTORNEY

United States Patent Office 3,004,398
Patented Oct. 17, 1961

3,004,398
DISPENSER AND CONTROLS THEREFOR
James N. Mullins, Jr., % Polar Chips Mfg. Co.,
P.O. Box 4398, Fort Worth 14, Tex.
Filed Apr. 8, 1959, Ser. No. 804,981
6 Claims. (Cl. 62—136)

This invention relates to the service of food, particularly in the food service industry. In a more specific aspect, this invention relates to controlled apparatus for making a food and/or drink merchandised desirably in and through food service businesses. In still a more specific aspect, this invention relates to controlled apparatus preferably used to produce a slushy or partially frozen food drink produced from water which has been fruit flavored and sweetened to appeal to the customer. Yet in a more specific aspect, this invention relates to controlled apparatus wherein a supply of a partially frozen and slushy food drink which is fruit flavored and sweetened is continuously and automatically supplied for withdrawal for customers and consumers of food service establishments, such food drink being dispensed having constant consistency. In still a more specific aspect, this invention relates to control means, more specifically control means to control the operation of refrigeration means for a machine to maintain the consistency of a mixture of water and ice therein, preferably fruit flavored and sweetened water, and still more specifically such control means being activated by the ice and water mixture itself acting through paddle means turning in the mixture.

The new control means of my invention and apparatus controlled thereby of my invention for making a partially frozen composition, preferably from fruit flavored and sweetened water, and disclosed and claimed herein is preferably used with or in the manner of the apparatus disclosed in the co-pending patent application of Caleb W. Barnum, Serial No. 710,129, filed January 20, 1958, and titled Means for Making Fruit Flavored Slushy Food Drink.

In the many different kinds and classes of food service business establishments, such as dairy stores which usually serve or deliver the food and drink products to the customer or consumer through small winnows or other outlets in the business establishment, drive-in restaurants wherein the consumers or customers are served by carhops, waitresses and/or waiters while seated in automobiles, restaurants wherein waitresses and/or waiters personally serve the patrons while seated in booths, at tables, etc., and restaurants of the cafeteria or self-service type wherein the diners wait on themselves and serve themselves largely, there are certain periods during the business day when trade is slack or at a standstill, at least relative to other periods of rush business or great business volume. For example, in a dairy store type food service operation, morning and middle of the afternoon business is usually slower than at noon, the dinner hour, or in the evening, particularly during the spring, summer and fall months when people are most likely to be out in the evening. It is this type of food service business, that is the dairy store, wherein it has been found that my invention is especially valuable. However, other food service businesses benefit greatly from the new apparatus of my invention, particularly the drive-in restaurant type operation. Also, of course, the new control means and apparatus of my invention for preparing a fruit flavored slushy food drink can very advantageously be used in connection with merchandising food drinks at such as athletic events, concerts, conventions, and the like. All of these have slack periods where sales are nonexistent or slow.

Slushy fruit flavored food drinks have long been known in the food service industry. They are commonly prepared in several ways and by several means from water which has been fruit flavored with either natural or synthetic flavoring, and which has been sweetened by the addition of sugar, syrup, etc. The usual flavors are orange, lemon, grape, and lime. However, other suitable flavors can be utilized, if desired, the freezing characteristics varying somewhat according to the flavor produced, the amount of sugar, and the conditions of freezing. Frequent stirring with a ladle of the fruit flavored and sweetened water in a can in turn in a freezing compartment has been used to prepare the slushy food drink. The ladle is then used to keep the mixture stirred up and to dip up the slush into an open container for serving to the patron or customer of the food service business. Agitation by mixers in the nature of beaters, etc., has been used during the partial freezing, such mixer also being utilized to maintain the slushy food drink in desirable dispensing condition. These means and methods are particularly disadvantageous. The slush tends to cake up, become hard to the point of being impossible to handle and work, and in many instances freezes to a solid mass that has to be completely thawed or thrown away in many instances. In almost all cases with this type of means, loss due to hardening on the inner surface of the can or container in the freezing compartment results. The very nature of the method and means using ladles, mixers, beaters, etc., leads to and creates in most instances an unsanitary condition, which of course, is very undesirable.

While the apparatus and method for preparing and dispensing a fruit flavored and sweetened slushy food drink of Barnum, referred to hereinbefore, overcomes the many undesirable features of the more or less hand operations described hereinbefore, the Barnum apparatus having proven very successful in actual operation in the food service industry, it has its disadvantages in that it requires relatively close attention and hand control operation during slack periods of business, during which time little or no slush is withdrawn from the apparatus. The compressor on the refrigeration means of the Barnum device has to be turned on and off by hand to prevent too much freezing, and in some instances it is difficult to maintain a satisfactory slush condition for dispensing and serving to the customer.

The new control means of my invention works particularly well with the Barnum apparatus, referred to hereinbefore and disclosed and described substantially hereinafter and in the drawings hereof. The resulting new apparatus of my invention overcomes all of the disadvantages of the methods and means of the prior art, providing foolproof apparatus which continuously delivers a slush food drink of constant desirable consistency, and automatically so. The new control means and apparatus of my invention for making a slushy food drink can be utilized with the commercially available fruit flavors, sugars, and syrups, which are widely available, and premixed or prepared by the owner, operator, or employee of the food service establishment wherein the apparatus is used.

The new apparatus of my invention for making fruit flavored water into slush has a tank. Refrigeration means are mounted in operating relation to this tank to remove heat passing through the walls of the tank, this occurring during the partial freezing of fruit flavored water in the tank, and during maintenance of resulting slush. In operation, paddle means are mounted to turn or rotate therein, such acting to keep the fruit flavored water agitated prior to partial freezing, and after partial freezing to keep the resulting water and ice mixture homogeneous throughout. The apparatus has power means to rotate the paddle means, and these power means in operation are mounted to limitably rotate with the paddle means. Means are employed to resist this rotation of the power means when mounted and in operation with force exerted through the paddle means to rotate the power means. And, the apparatus has means operated by the power means upon rotation thereof in operation, to control the operation of the refrigeration means used to remove heat through the tank or container from the starting material and product produced. The apparatus of my invention for making fruit flavored water into slush is constructed and operable to receive fruit flavored water in the tank or container, freeze a portion of the fruit flavored water to a slush condition in said tank or container, and automatically maintain it in a desired condition, preferably a condition for ideal consumption by the customer or consumer, and for dispensing the slush into an open container for delivery to the patron or customer.

The new control means of my invention is particularly desirably used with the apparatus of my invention for making fruit flavored water into a slush set forth hereinbefore, specifically that portion thereof of the tank or container, the refrigeration means for removing heat passed through the walls of the tank or container during operation, and the paddle means mountable in the tank or container to turn or rotate therein. The control means of my invention function to operate the paddle means, such control means having a powering means which in operation turns the paddle means and is mounted to limitably rotate with the paddle means. Means are employed to resist this rotation of the powering means when mounted and in operation with rotating force exerted thereon through the paddle means turning in the slush in the tank or container. Means are used which are operable by the powering means upon rotation of same, and these last-named means in operation are connected to control the operation of the refrigeration means.

It is an object of this invention to provide new means for the food service industry.

It is another object of this invention to provide controlled apparatus for preparing slushy drinks and/or foods for merchandising in establishments in the food service industry.

Still another object of this invention is to provide new controlled apparatus for making water which has been sweetened and fruit flavored into a slush food drink, such apparatus being employed to make and dispense such slush in the food service industry, particularly in businesses or establishments commonly called dairy stores in such industry.

Yet another object of this invention is to provide new control means for apparatus for preparing fruit flavored and sweetened slush food drinks, to in turn provide a controlled apparatus to automatically make and dispense a slush of constant consistency, and automatically.

It is still another object of this invention to provide new and more convenient and reliable means for preparing and dispensing fruit flavored slush drinks, such apparatus automatically maintaining and dispensing such slush of constant and desired consistency, and such apparatus being easy to manufacture and use, and such apparatus providing for sanitary making and dispensing of the slush food drink.

Other objects and advantages of the new controlled apparatus of my invention for making fruit flavored water into slush, maintaining such in desired constant consistency, and dispensing same, and the new control means of my invention cooperatively incorporated therein, will be apparent to those skilled in the art upon reading this disclosure.

Drawings accompany and are a part of this disclosure. These drawings depict preferred specific embodiments of the new controlled apparatus and control means therefor of my invention for making fruit flavored water into a slush, and it is to be understood that such drawings are not to unduly limit the scope of my invention.

Figure 1:
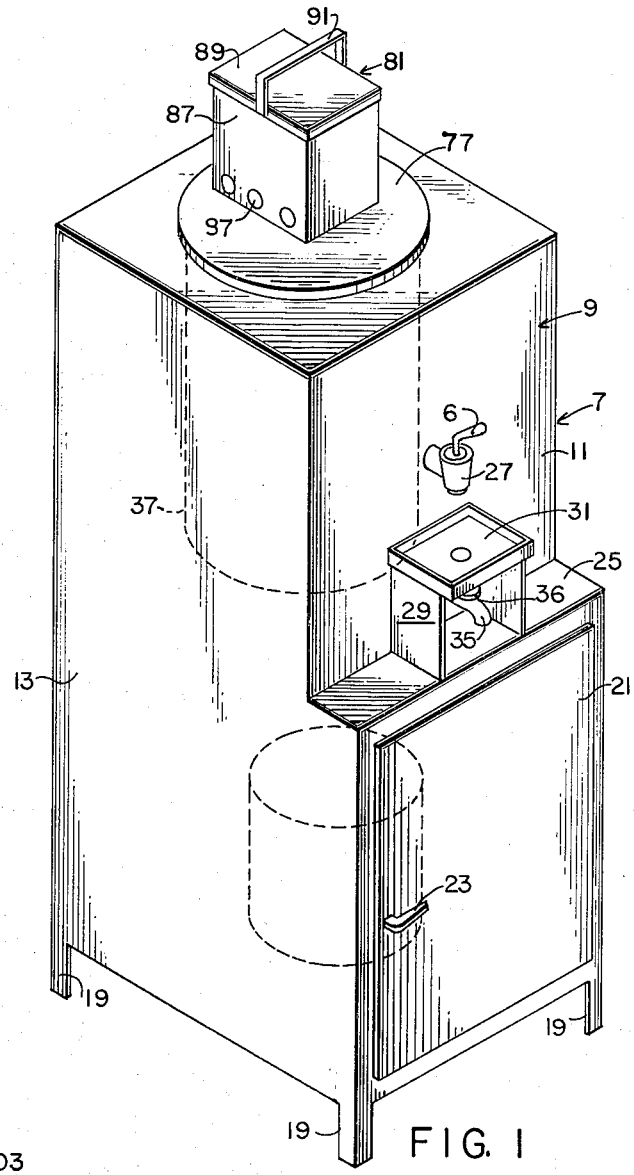
FIG. 1 is a perspective view of a preferred specific embodiment of the new controlled apparatus of my invention for producing and dispensing a slushy drink from fruit flavored and sweetened water.

The following is a discussion and description of the new controlled apparatus of my invention for making fruit flavored water into a slush, and the new control means of my invention incorporated therewith, such discussion and description being made with reference to the drawings whereon the same reference numerals are used to indicate the same or similar parts and/or structure. The discussion and description is of preferred specific embodiments of the new controlled apparatus and control means of my invention, and it is to be understood that such is not to unduly limit the scope of my invention.

Figure 2:
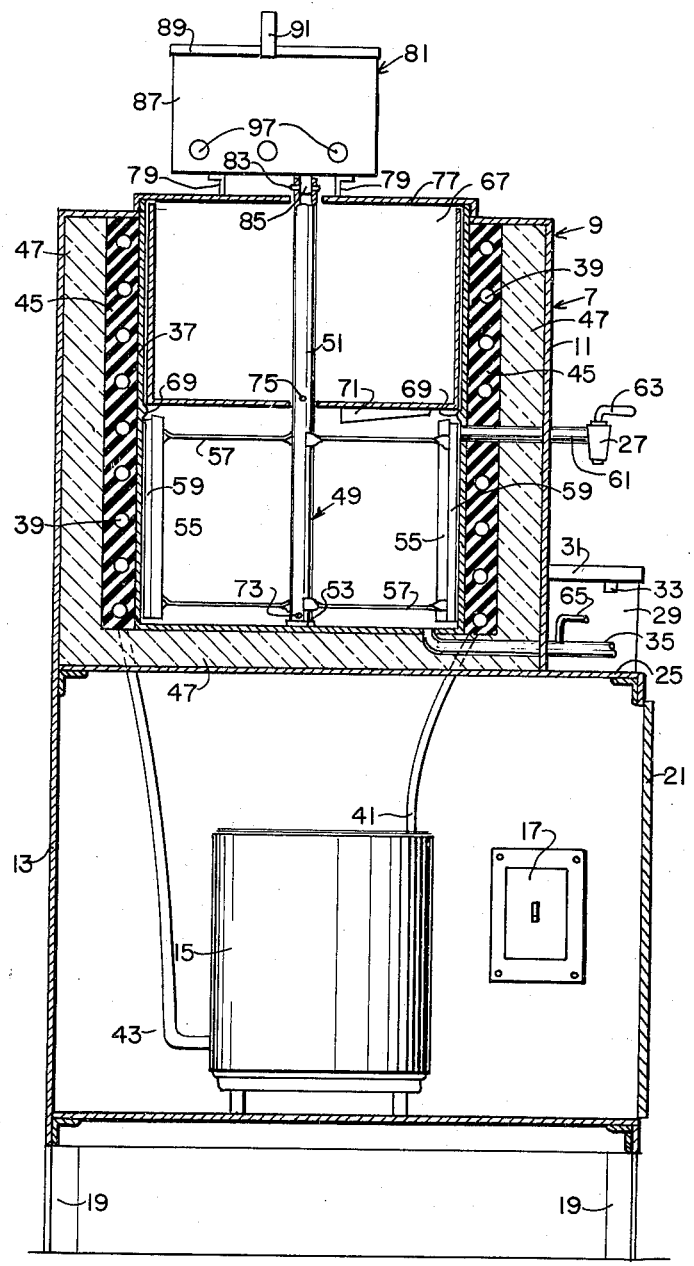
FIG. 2 is a longitudinal elevation view partly in cross section of the apparatus shown in FIG. 1.

Referring now to the drawings, in FIGS. 1 and 2 is shown a preferred specific embodiment of the new means of my invention for making, maintaining and dispensing a slushy, fruit flavored food drink. Numeral 7 designates the machine generally. The machine 7 proper, with the exception of the powering means mounted on top thereof, is very substantially the same slush making and dispensing machine as that of Barnum disclosed and claimed in his pending patent application, referred to hereinbefore. The slush making, maintaining and dispensing machine 7 has an outer housing 9 which can be made of any suitable material in any suitable manner, preferably housing 9 is made of metal sheet such as enameled metals, stainless steel, polished aluminum, or combinations of such as these. The upper portion 11 of housing 9 encloses the means proper for producing and containing the slushy food drink for dispensing. The housing 9 preferably has a lower portion 13 which encloses and houses mechanical refrigeration equipment, preferably specifically a compressor-motor unit 15 of usual and standard design, and protected and controlled by usual and common breaker and master switch means 17 mounted in a suitable manner on one of the walls of housing portion 13. Housing 9 preferably is mounted on and supported by legs 19 suitably attached thereto. A door 21 is preferably provided and hingedly mounted in the front of lower portion 13 of housing 9. Common latch means (not shown) operable by common handle 23 is preferably provided to secure door 21. This provides for access to compressor and motor unit 15 for repair, replacement, etc., and it has been found that the lower portion 13 of housing 9 can conveniently be used for storing such as syrup, fruit flavoring, etc., if desired. A ledge 25 is provided for at the juncture of upper portion 11 and lower portion 13 of housing 9, such preferably being provided for in construction with the top surface of ledge 25 being a portion of the top of lower portion 13 of housing 9. Ledge 25 is used for the support of means to hold paper cups, or the like, into which the slushy food drink from the machine 11 is passed in dispensing operation through spigot 27. Support means is preferably mounted on ledge 25 to hold the paper cups thereon for receiving the dispensed slush, and this support means preferably has spaced side members 29 mounting and supporting a drip pan 31 having a drain 33 therein. Side members 29 and drip pan 31 are suitably secured to upper portion 11 of housing 9 and ledge 25 in any suitable manner such as by welding them thereto. It is preferred that ledge 25 have a usual drain therein (not shown) to receive and pass off any drippings from pan 31 through drain 33, resulting from spilling slush in operation, and such a drain can be used to receive and pass off washings from the slush making machine 7, etc., the main drain line 35 having suitable valve means 36 therein.

The equipment for slush making in machine 7, with the exception of the refrigeration motor-compressor means, is enclosed in upper portion 11 of the housing 9 of the machine. See FIG. 2. There is an elongated, cylindrical, and vertically disposed tank 37 which is preferably made of a metal, such as stainless steel, which has high conductivity for heat therethrough. The tank 37 is preferably insulated on the outside thereof throughout its length and on the bottom between the tank 37 and the top of lower housing portion 13 of housing 9. Refrigeration cooling coils 39 are preferably wrapped around tank 37 in close heat exchange relation thereto, preferably in direct contact with the outside surface of tank 37. These cooling coils 39 of the refrigeration means for machine 7 are connected in the usual and a suitable manner to the compressor of the compressor-motor unit 15, the inlet of the cooling coils 39 being connected to the discharge 41 of the compressor and the outlet of cooling coils 39 being connected to the inlet 43 of the compressor. Of course, the usual and common refrigeration condenser coil and expansion valve (not shown) which can be a part of unit 15, if desired, are preferably employed. And, if desired, removal of heat from tank 37 through the wall thereof can be accomplished by circulating a chilled cooling medium through coils 39, such being chilled by a refrigeration system, which also can be represented by unit 15. It is preferred that cooling coils 39 of the refrigeration system be embedded in a supporting and insulating material 45, which can conveniently be of a rubber-like nature, asphalt, tar, etc. This has been found to be a desirable construction to position and maintain the coils 39 in proper heat exchange relation to tank 37, and to properly insulate coils 39 and tank 37 immediately adjacent thereto. Additional insulation material 47 is preferably placed between upper portion 11 of housing 9 and the top of lower housing portion 13, and tank 37 which is surrounded on its sides by cooling coils 39 and mounting and insulation material 45. It has been found in practice, that so-called Rubbertex insulation is satisfactory. Other materials are also suitable, such as fiberglass mat, foamed plastic materials, etc.

During operation, tank 37 has paddle means 49 removably mounted therein for rotation. These paddle means consist of an elongated hollow center operating shaft 51, preferably made of stainless steel or other suitable material. This shaft 51 when in position is co-axial with the longitudinal axis of tank 37, and the shaft is adapted to rotate within tank 37. The shaft 50 is preferably bearingly mounted in its lower end in bearing means 53 suitably attached to the bottom of tank 37 in the middle thereof, and of course, any of a number of bearing mounts can be used, as desired. Operating shaft 51 is hollow and preferably throughout its length, the shaft 51 serving as a conduit, as will be set forth hereinafter. The paddle means 49 has paddle members 55 preferably oppositely mounted on shaft 49 parallel thereto and to rotate therewith. Paddle members 55 are attached to and spaced from shaft 49 by arm members 57 suitably mounted and secured to the paddles and operating shaft. The paddle members 55 preferably have an outer portion 59 with a sharpened edge, with the sharpened edge in operation passing in relatively close scraping relation to the inner walls of tank 37 in the lower freezing portion thereof to prevent a substantial build-up of ice on the inner walls of tank 37 during production of and maintaining the slush food drink in the lower portion of tank 37 for dispensing through spigot 27. It has been found from operation that it is desirable that the outer sharpened edges of paddle portions 59 be spaced in operation approximately $\frac{1}{16}$ to $\frac{1}{8}$ inch from the inner walls of tank 37.

During production of the slush and maintenance of same for dispensing, the paddle means 49 rotates relatively slowly in tank 37 in the lower freezing portion thereof, and it is herein where the fruit flavored slushy food drink produced by machine 7 is made and maintained. The slush produced and maintained in the lower freezing portion of tank 37 is withdrawn from the tank preferably from the upper portion of the lower freezing portion through conduit 61 and spigot 27. It is forced therethrough and thereout by the hydrostatic head of fluid, resulting from fluid in a storage container member mounted in the upper portion of tank 37, such fluid being in communication with the slush in the lower freezing portion of tank 37, as will be set forth hereinafter. Spigot 22 is preferably an open cock type valve having an operating handle 63. The drain line 35 is preferably connected into the bottom of tank 37 so that tank 37 can be drained and washed out conveniently, if such is desired. If desired, drain line 35 can be used to pass carbon dioxide into tank 37 to partially carbonate slush therein, such carbon dioxide conveniently being introduced into drain line 37 via conduit 65 in communication therewith.

As referred to hereinbefore, in the upper portion of tank 37 is mounted, a removable storage or feed material tank 67. This tank 67 is preferably open in its upper end and has a centrally located hole in the bottom thereof to receive shaft 51. This hole and shaft 51 are preferably constructed to have relatively close clearance to be relatively leak proof or resistant thereto, when in operation shaft 51 rotates within the hole in the bottom of tank 67. The walls of tank 37 are crimped at point 69 to provide a ledge which engages the bottom of tank 67 when mounted in tank 37 to properly position tank 67 therein. Of course, other means can be utilized to perform this positioning function. Tank 67 has a baffle 71 mounted on the bottom thereof to project outwardly therefrom, this baffle 71 projecting downwardly into the freezing portion of tank 37. In operation with paddle means 49 rotating, the baffle 71 acts to guide and direct slush toward the inlet of conduit 61 in the wall of tank 37 to be passed therethrough and out spigot 27. This baffle 71 has proven particularly desirable, preventing build-up of slush and improper operation of machine 7.

The shaft 51 which is preferably hollow throughout its length has a hole or spaced holes 73 in the lower end portion to be positioned in the bottom of tank 37 when shaft 51 is mounted therein. Another hole or plurality of spaced holes 75 are in the hollow shaft 51 at a point so that when shaft 51 is mounted in tank 37, this hole or holes 75 are positioned just above the bottom of the storage or feed tank 67. Thus, fluid communication is provided between tank 67 and the lower portion of tank 37 when paddle means 49 and tank 67 are mounted in tank 37 for operation. As a result, in operation, when slush material is withdrawn from the freezing portion of tank 37 through conduit 61 and spigot 27, fruit flavored and sweetened water feed material will pass from tank 67 through hole 75 in hollow shaft 51, then down through shaft 51 and out through hole 73 into the lower portion of the lower freezing section of tank 37. This is the path of least resistance to flow, and the hydrostatic head of fluid above conduit 61 forces the slush into conduit 61 and therethrough. As has been set forth hereinbefore, relatively leak proof or resistant clearance is maintained between the hole in the bottom of tank 67 which receives operating shaft 51 and the shaft.

A lid or cap 77, which can have a hingedly mounted portion (not shown), if desired, is provided to form the top of the housing 9. This lid 77 is preferably made easily removable, for removing the operating mechanism mounted in tank 37, and for easy addition of additional fruit flavored and sweetened water feed material into tank 67. Support members 79 are suitably secured to the lid 77.

These support members 79 receive and mount a motor and gearing unit 81 which functions in operation to drive operating shaft 51 and paddle means 49 thereof. The upper end of hollow shaft 51 is slotted to receive pin 83, pin 83 being mounted in the drive shaft 85 which is driven by motor and gearing unit 81. Drive shaft 85 when mounted projects down into the upper end of operating shaft 51.

Figure 5:
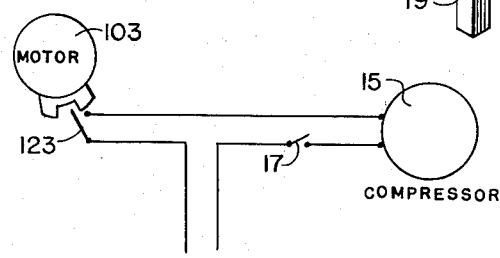
FIG. 5 is a diagrammatic circuit drawing of the motor and compressor means of the apparatus, showing the motor means constructed and adapted to operate a switch in the compressor circuit.
Figure 4:
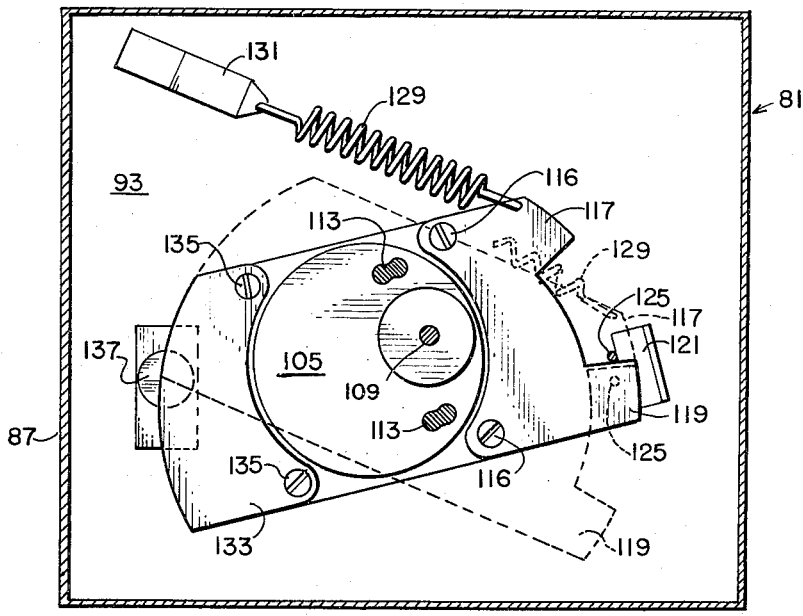
FIG. 4 is a view taken on line 4—4 of FIG. 3.
Figure 3:
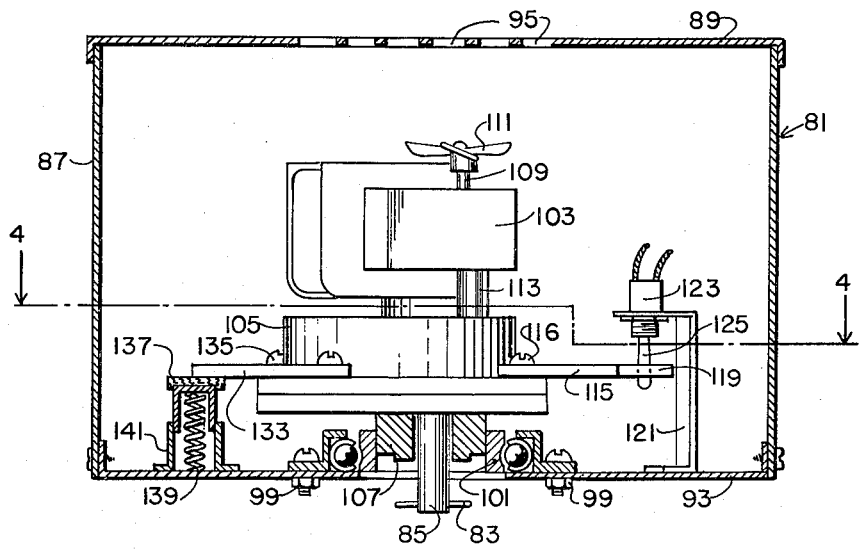
FIG. 3 is an enlarged elevation view partly in cross section of the motor means mounted on top of the apparatus shown in FIGS. 1 and 2.

In FIGS. 3 and 4 is shown a preferred specific embodiment of the new geared motor drive means of my invention for driving operating shaft 51 of slush machine 7 through connecting drive shaft 85 and pin 83 thereof. The geared motor unit 81 has a housing of sides 87, lid 89 with a handle 91 secured thereto in a suitable manner, and a bottom 93. Lid 89 preferably has apertures 95 therethrough for air circulation and cooling purposes, as do the sides 87 through holes 97 therein. The geared motor unit 81 can be mounted in operation in any suitable manner on slush machine 7, preferably on mounting posts 79 which are secured to the lid 77 of the slush machine 7 proper. Nut and bolt means 99 can suitably be positioned so as to be between horizontally elongated mounting members 79 to prevent turning of unit 81 in operation, with central positioning being accomplished by shaft 85 projecting in the upper end of operating shaft 51. A ball bearing assembly is secured in the bottom 93 by nut and bolt means 99. This ball bearing assembly has an inner freely rotatable race 101. The motor 103 and gear box therefor 105 has a mounting member 107 secured thereto to move in unison therewith. This mounting member 107 is attached to rotatable race 101 and therein to turn with the race. This securing may be done by welding, if desired, or by other suitable means. The motor 103 is connected to a usual gear box 105 by the motor drive shaft. The upper end portion of the motor drive shaft 109 mounts for rotation a cooling fan 111, which in operation serves to cool motor 103. The drive end of drive shaft 109 of motor 103 is shown in cross section in FIG. 4. Spacing and mounting posts 113 connect motor 103 and gear box 105 together in operation and to rotate in unison. A plate 115 is suitably mounted on gear box 105 to turn therewith, such as by bolts 116 passing therethrough and being threadedly secured in the ledge portion of gear box 105 assembly. Plate 115 has spaced arm portions 117 and 119 projecting therefrom. A post 121 is suitably secured and mounted on the bottom 93 of unit 81, and this post 121 mounts throw switch 123 in the position best shown in FIG. 3 of the drawings, with the switch operator 125 projecting downwardly. Upon rotation of motor 103, gear box 105 and bearing race 101, arm portions 117 and 119 engage switch operator 125 to throw switch 123 into on or off position. The extremes of the position of arm members 117 and 119 upon rotation to operate switch 23 are shown in FIG. 4 of the drawings, the full load position to open switch 123 being drawn in dotted lines. A spiral spring 129 is anchored in one end by a mounting member 131 suitably secured to the bottom 93 of unit 81. The other end of spiral spring 129 is pivotally secured to plate 115. This spring 129 acts in tension to resist rotation of the motor 103 and gear box 105 upon torque being applied thereto to cause rotation through forces exerted through paddle means 49, operating shaft 51 and drive shaft 85 coupled thereto. The thicker the slush in the freezing section in the lower portion of tank 37 during operation, the greater the force exerted through the paddle means 49, etc., to rotate the motor and gear box assembly upon the motor 103 operating to turn paddle means 40 in the slush. When the force is great enough due to the thickness of the slush, plate 115 will have turned to the dotted line position of FIG. 4, whereupon arm 117 contacts switch operator 125 to open switch 123, and thereby shut off the compressor of motor-compressor unit 15. See schematic diagram, FIG. 5.

A frictional rub plate 133 is suitably secured to gear box 105 to turn therewith, such as by mounting bolts 135. This rub plate 133 cooperates with a rub block 137, which is spring loaded by spiral spring 139, spring 139 acting in compression to urge the frictional rub block 137 up against plate 133. The frictional rub block 137 is retractably mounted in a tubular member 141 suitably secured to the bottom 93 of unit 81 and retaining spiral spring 139. The frictional rub plate 133 and block 137 cooperate to provide a resistance to any sudden or momentary turning force exerted through paddle means 49, caused by such as a lump of material formed in the freezing section of tank 37 during operation.

In operation of the apparatus, the sweetened and fruit flavored water to be partially frozen to provide a slush condition is introduced into tank 37, preferably up to approximately the level of the bottom of feed material or storage tank 67. Then the paddle means 49 having operating shaft 51 is inserted, followed by placing tank 67 in tank 37 with operating shaft 51 passing upwardly therethrough. Tank 67 is then normally filled with fruit flavored sweetened water to be used subsequently to produce slush. With the lid 77 in place, the rotating means unit 81 is mounted thereon with the drive shaft 85 thereof and operating shaft 51 coupled in operating engagement. To begin with, spiral spring 129 maintains plate 115 in the position shown by the solid lines in FIG. 4 with the compressor circuit closed for operation of the refrigeration means. Master switch 17 is closed. Motor 103 runs constantly in operation, to continuously turn paddle means 49. And, paddle means 49 preferably is rotated relatively slowly.

It should be noted that the freezing point of the sweetened and fruit flavored food drink will vary slightly according to the concentration of sugar and flavoring. However, it has been found that the means of my invention will handle any of the commonly used flavorings and sugar concentrations with ease and reliability. When the slush has reached desired consistency, it can be withdrawn from machine 7 through conduit 61 and spigot 27. When during a slack period of business, the slush becomes too thick as a result of freezing, the force exerted on paddle means 49 as a result of turning in the slush will become great enough to rotate motor 103 and gear box 105 to the position shown in the dotted lines of FIG. 4. As a result, arm 117 will throw switch operator 125 to place switch 123 in open position, thus shutting off the compressor 15, and stopping freezing of the fruit flavored and sweetened water. Upon melting of some of the ice to make the slush less thick, force will be decreased on paddle means 49, allowing spiral spring 129 to turn motor 103 and gear box 105 counterclockwise to the position of the solid lines in FIG. 4. Upon this occurring arm 119 contacts switch operator 125 to close switch 123 and start compressor 115 of the refrigeration system to maintain the desired consistency of the slush.

As will be evident to those skilled in the art, various modifications of this invention can be made, or followed, in the light of this disclosure and discussion, without departing from the spirit or scope of the disclosure, or from the scope of the claims.

I claim:

1. Apparatus for making and dispensing a slushy, fruit flavored, food drink comprising, a combination, a vertically disposed cylindrical tank having a lower freezing portion and an upper storage portion, refrigeration means including a compressor and cooling coils mounted in cooling relation to said tank operative to remove heat passing through the walls thereof, paddle means mounted in said tank and comprising, an operating shaft hollow in its lower portion and removably mountable in said tank, paddles spaced from said shaft and attached thereto in the lower portion to in operation turn with said shaft and in relatively close scraping relation to the walls of said tank in said freezing portion thereof, a storage tank removably mountable in said upper storage portion of said first-named tank with said shaft passing through a hole in the bottom of said storage tank, a slush outlet in the upper portion of said freezing portion of said first-named tank and a drain outlet in the lower portion of said freezing portion of said first-named tank, baffle means mounted on the bottom of said storage tank and projecting downwardly therefrom, said baffle means constructed and positioned to in operation direct slush to said slush outlet, a hole in said hollow portion of said shaft above the bottom of said storage tank and a hole in the hollow portion of said shaft in said freezing portion of said first-named tank providing a fluid communication between said storage tank and said freezing portion of said first-named tank, means including an electrically driven motor, gearing therefor and a drive shaft removably mountable on said apparatus to engage and turn said operating shaft, said motor, gearing and drive shaft so mountable to limitably rotate together upon rotation of said operating shaft by said motor, an anchored spiral spring connected to said motor to in tension resist rotation of said motor, gearing and drive shaft upon rotation of said operating shaft by said motor, a fixed and spring-loaded rub block engaging a portion of said motor, gearing and drive shaft to resist rotation thereof due to momentary relatively strong force being exerted thereon, a fixed throw switch operatively connected to start and stop said compressor and mounted to be engaged by means with said motor, gearing and drive shaft to operate said switch upon said motor, gearing and drive shaft turning in either direction relative to said operating shaft, and said apparatus constructed and operable to receive water in said storage tank, pass same to said freezing portion of said first-named tank, therein freeze a portion of said water to provide a slush condition, and automatically maintain such a slush condition of desirable physical characteristics.

2. Apparatus for freezing fruit flavored water to provide a slushy material comprising, in combination, a tank having a freezing portion separable from a feed material portion, means constructed and mountable in said tank to so separate said tank, refrigeration means including a compressor and cooling coils mounted and operable to remove heat passing through the walls of said tank, paddle means having an operating shaft and mountable in said freezing portion of said tank to turn therein in operation, a slush outlet in said freezing portion of said tank, conduit means constructed and adapted to pass water from said feed material portion of said tank into said freezing portion of said tank, motor means having a drive shaft removably mountable on said apparatus to engage and turn said operating shaft, said motor means mountable to limitably rotate with said operating shaft upon operation of said motor, anchored resilient means connected to said motor means to resist rotation thereof upon rotation of said operating shaft by said motor means, friction means engaging a portion of said motor means to resist rotation thereof due to momentary relatively strong forces exerted on said operating shaft during operation of said apparatus, and switch means operatively connected to start and stop said compressor and mounted to be engaged by means with said motor means to operate said switch means upon said motor means turning in either direction, and said apparatus constructed and operable to receive water in said feed material portion of said tank, pass same to said freezing portion of said tank through said conduit means, therein freeze a portion of said water to produce a slush condition and maintain said slush condition with desirable physical characteristics.

3. Apparatus for making fruit flavored water into a slush comprising, in combination, a tank, said tank having separation means therewith to separate same into a freezing portion and a feed material portion, refrigeration means mounted and operable relative to said tank to remove heat passing through the walls thereof, paddle means mountable in said freezing portion of said tank to turn therein in operation, a slush outlet in said freezing portion of said tank and means to pass material from said material portion to said freezing portion of said tank, power means mountable to turn said paddle means and to limitably rotate therewith, means to resist rotation of said power means when mounted and in operation with force exerted through said paddle means to rotate said power means, and means operable by said power means upon rotation of same to start and stop said refrigeration means, said apparatus constructed and operable to receive fruit flavored water in said material portion of said tank, transfer a portion of same to said freezing portion of said tank and freeze a portion of same therein to slush condition, and maintain a desired slush condition.

4. Apparatus for making fruit flavored water into a slush comprising, in combination, a tank having a freezing portion and a feed material portion, means to pass material from said material portion to said freezing portion, a slush outlet in said freezing portion, refrigeration means mounted and operable relative to said tank to remove heat passing through the walls thereof in said freezing portion thereof, paddle means mountable in said freezing portion of said tank, power means operably connected to said paddle means to rotate same and to limitably rotate therewith, means to resist rotation of said power means when mounted and in operation, and switch means operable upon limited rotation of said power means to start and stop the operation of said refrigeration means, said apparatus being constructed and operable to receive fruit flavored water in said material portion of said tank, transfer a portion of same to said refrigeration portion of said tank and partially freeze same therein to a slush condition and maintain same in a desired slush condition.

5. Apparatus for making a partially frozen water containing food composition comprising, in combination, tank means with separate portion for feed material and freezing, refrigeration means mounted and operable relative to said freezing portion of said tank means to remove heat therefrom, paddle means mountable in said freezing portion of said tank means, slush outlet means in said freezing portion of said tank means, power means operatively connected to said paddle means to turn same in operation, and switch means operatively connected to said refrigeration means to start and stop same, said switch means being connected to be responsive to a change of torque on said paddle means to, in operation, stop and start said refrigeration means when the torque has reached a predetermined value.

6. Apparatus for making fruit flavored water into a slush comprising, in combination, tank means having separate freezing and feed material portions, means to move material from said material portion to said freezing portion of said tank means, slush outlet means in said freezing portion of said tank means, refrigeration means mounted and operable relative to said tank to remove heat from said freezing portion thereof, paddle means mountable in said freezing portion of said tank means, power means operably connected to said paddle means to rotate same, and torque responsive switch means operably connected to said refrigeration means and said paddle means to control said refrigeration means in response to the slush condition in said tank means.

References Cited in the file of this patent

UNITED STATES PATENTS

| 2,536,319 | Slack | Jan. 2, 1951 |
| 2,541,814 | Gaddini | Feb. 13, 1951 |
| 2,836,038 | Morgan | May 27, 1958 |
| 2,927,440 | Kohl | Mar. 8, 1960 |

FOREIGN PATENTS

| 142,739 | Austria | Sept. 10, 1935 |

Notice of Adverse Decision in Interference

In Interference No. 93,834 involving Patent No. 3,004,398, J. N. Mullins, Jr., Dispenser and controls therefor, final judgment adverse to the patentee was rendered July 30, 1964, as to claims 4, 5 and 6.

[*Official Gazette October 27, 1964.*]